Oct. 21, 1969  F. DION  3,473,619
ARTICULATED MOTOR VEHICLE
Filed Nov. 20, 1967  3 Sheets-Sheet 1
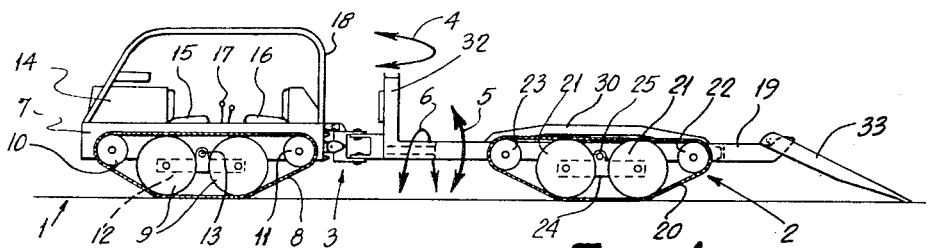
Fig. 1
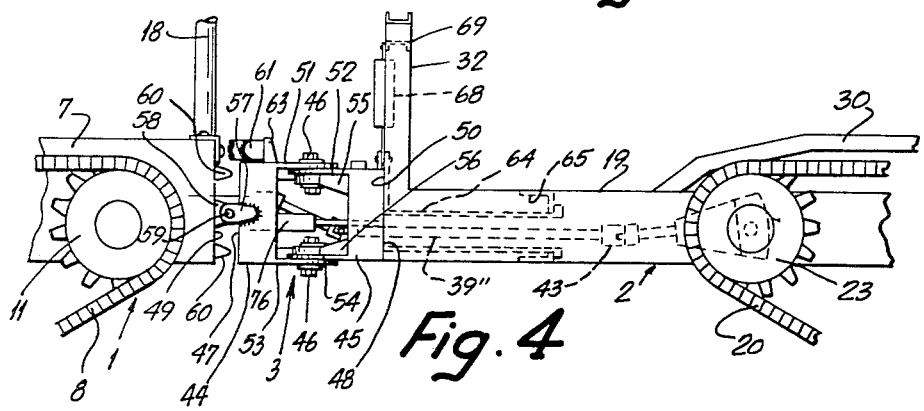
Fig. 4
Fig. 6
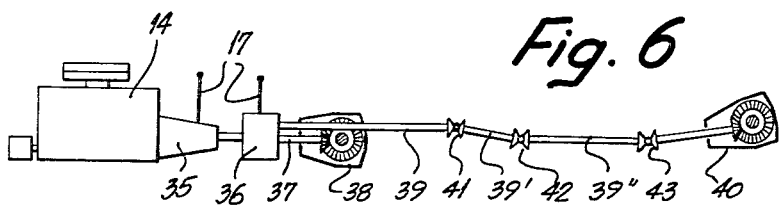
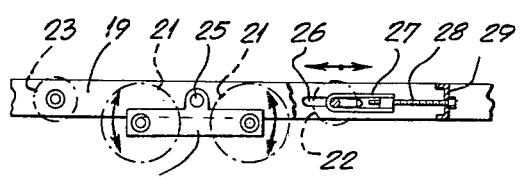
Fig. 5
INVENTOR
Fernand DION
By Pierre Lespérance
AGENT Oct. 21, 1969  F. DION  3,473,619
ARTICULATED MOTOR VEHICLE
Filed Nov. 20, 1967  3 Sheets-Sheet 3

INVENTOR
Fernand DION

By Pierre L'espérance

AGENT 3,473,619
ARTICULATED MOTOR VEHICLE
Fernand Dion, St. Raymond, Quebec, Canada
Filed Nov. 20, 1967, Ser. No. 684,462
Int. Cl. B62d 55/00, 7/00; B60d 1/16
U.S. Cl. 180—9.44                                      6 Claims

ABSTRACT OF THE DISCLOSURE

This invention concerns an articulated vehicle comprising first and second motorized endless track units interconnected by a joint for universal pivoting movement of one unit relative to the other, said joint comprising two pivotally interconnected parts capable of movement one with respect to the other in a horizontal plane only, each part connected to the respective units for movement in only one plane, the two latter planes being at right angles to each other, and motorized extensible means disposed between and connected to the two parts for steering the vehicle.

---

The present invention resides in the provision of an articulated vehicle for use on and off roads and, more particularly, to an articulated endless track motor vehicle for use in forestry work for transporting logs from the area where the trees are cut down to the road or the river.

However, the vehicle of the invention can be slightly modified for the transport of passengers or other merchandise over a terrain which is normally inaccessible to trucks and ordinary motor vehicles.

The articulated vehicle in accordance with the present invention is of the type comprising at least two units which are articulated to one another in tandem, that is one behind the other, each unit provided with its endless track system to support and displace said unit, each endless track system being motor driven, the front unit carrying the engine of the vehicle and the rear unit carrying the load.

The general object of the invention resides in the provision of an articulated vehicle of the character described, provided with an improved joint between the two units which enables one unit to pivot in three planes with respect to the other, that is in horizontal plane for steering of the vehicle and in pitch and in roll to enable the vehicle to go over uneven ground, the vehicle being provided with a positive steering system comprising extensible motorized means connected to two joint parts which can pivot relative to each other only in a horizontal plane, whereby said steering means are not subjected to lateral and torsional forces but only work along their longitudinal axes, and wherein the pitch pivot axis is close to the front vehicle unit to eliminate vertical bending forces on the joint parts when the front unit pulls the load carrying rear unit.

Another object of the invention resides in the provision of a vehicle of the character described, which can move rearwardly or forwardly, thereby eliminating turn-around of the vehicle at the end of a narrow path.

Another object of the invention resides in the provision of an articulated vehicle of the character described, provided with stabilizers in its articulated joint serving to resiliently urge the two units into normal relative positions and with means to limit the amount of pivoting of one unit with respect to the other in roll and in pitch, whereby the vehicle can negotiate bumps and recesses in the ground by pivoting to a certain maximum degree, which is less than the degree which would cause lateral overturning of one or the other of the units or overturning of the load towards the front or back of the load carrying unit, the two units behaving as a rigid bridge when they have reached a maximum degree of angular pivoting in pitch and in roll.

Another object of the present invention resides in the provision of an articulated vehicle of the character described, wherein the endless tracks of the two units enable a great flexibility in negotiating bumps and recesses in uneven ground.

Another object of the present invention resides in a simple power transmission system from one unit to the other.

The foregoing and other objects of the invention will become more apparent during the following disclosure and by referring to the drawings, in which:

FIGURE 1 is a side elevation of the articulated unit in a position for receiving a load of logs;

FIGURE 4 is a partial side elevation, on an enlarged scale, of the articulation zone between the two units;

FIGURE 5 is a longitudinal section of the load-carrying unit showing the wheel arrangement for carrying an endless track;

FIGURE 6 is a schematic view of the engine and transmission system;

In the drawings, like reference characters indicate like elements throughout.

Figure 2:
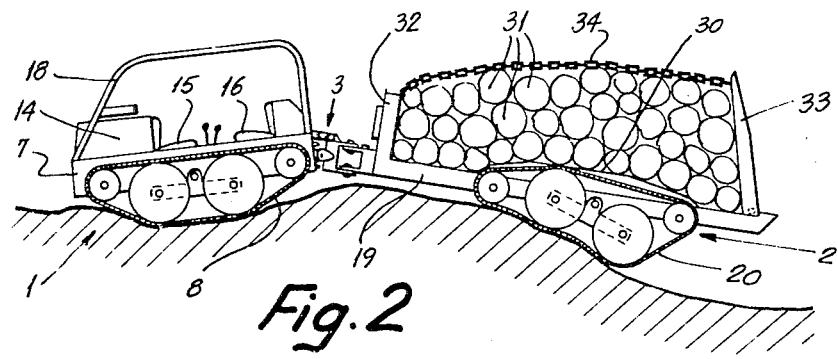
FIGURE 2 is a side elevation of the unit loaded with logs and negotiating rough ground.
Figure 3:
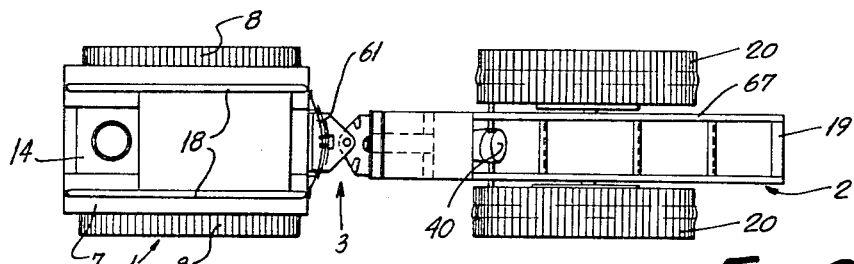
FIGURE 3 is a top plan view of the vehicle.

The articulated vehicle in accordance with the invention comprises a driving unit 1 and a load-carrying unit 2 disposed in tandem, that is one behind the other, and articulated together by means of a joint, generally indicated at 3.

Joint 3 enables relative pivotal movement of the two units 1 and 2 in three planes, namely: in a horizontal plane as indicated by double arrow 4, in a vertical plane indicated by double arrow 5 and in a transverse plane indicated by double arrow 6.

Driving unit 1 comprises a chassis or frame 7 supported by an endless track system comprising endless track 8 on both sides surrounding a pair of large diameter wheels 9 and terminal wheels 10 and 11, of smaller diameter.

Front wheel 10 is an idle wheel whereas back wheel 11 is a sprocket driving wheel for the track. The two large diameter wheels 9 are mounted at the end of an arm 12 pivoted at its center 13 to chassis 7 of the driving unit 1. Therefore, the two wheels 9 may pivot in a vertical plane about pivot 13, whereas the wheels 10 and 11 are mounted in journals which are secured to chassis 7.

An internal combustion engine 14 is mounted at one end of the chassis 7 of the driving unit 1 and two seats 15 and 16 are mounted on unit 1. These two seats face each other and are alternately occupied by the vehicle driver, depending on the direction of movement of the vehicle, that is depending whether driving unit 1 is at the front or at the back with respect to the direction of travel.

Between the two seats 15 and 16 are disposed control levers 17 which can be operated from either one of the seats 15 and 16. Upwardly extending bent tubular members 18, secured to chassis 7, serve as a guard, or protecting elements, for the driver.

The load-carrying unit 2 comprises a chassis 19 provided on each side with endless tracks 20 supported by large diameter wheels 21, an idle smaller diameter wheel 22 and a driving sprocket wheel 23. Large diameter wheels 21 are rotatably mounted at the ends of a horizontal arm 24 pivoted at its center 25 to chassis 19, whereby the two wheels 21 can pivot about said pivot 25 in a vertical plane.

Sprocket wheel 23 is mounted in a journal secured to chassis 19, whereas idle wheels 22, as shown in FIGURE 5, are mounted in a sleeve-like journal which can be adjustably displaced in longitudinal slots 26 made in the longitudinal members of the chassis 19, said journal being surrounded adjacent each longitudinal member by an elongated stirrup 27 provided at one end with a threaded hole, in which is screwed a bolt 28, the head of which engages a transverse member 29 of the chassis 19 of the load-carrying unit 2. Thus, idle wheels 22 can be adjusted longitudinally of chassis 19 to adjust the tension on the endless tracks 20.

The same system can be provided on the driving unit for the idle wheels 10.

The chassis 19 carries raised longitudinal frame members 30 adapted to support transversely stacked tree logs 31, as shown in FIGURE 2, in such manner that the endless tracks 20 can move freely underneath the logs irrespective of the deformation of the tracks caused by pivoting of arms 24. The logs are maintained in position by a retaining frame 32 rigidly secured in upstanding position at the inner end of the load-carrying unit, adjacent the driving unit, and by a retractable retaining frame 33 at the opposite outer end of the unit pivoted thereto to take an upstanding position, as shown in FIGURE 2, to retain the logs 31 or to take a lowered loading or unloading position, as shown in FIGURE 1.

The retaining frame 33 is locked in upstanding position by means, not shown, and, moreover, a chain 34 attached to the two retaining frames 32 and 33 over the load of logs, serve to maintain the same in position.

Retaining frame 33, when in lowered position, rests on the ground, as shown in FIGURE 1, and serves to load or unload the logs on and from the unit.

The driving means comprise an internal combustion engine 14, as shown in FIGURE 6, which is provided with a transmission box 35, preferably a five-speed transmission box, the outlet shaft of which is connected to the inner shaft of a reversing box 36.

Said reversing box 36 has a first outlet shaft 37 connected to a differential 38 and connected to the driving sprocket wheels 11 of the endless track system of the driving unit 1. Reversing box 36 has a second outlet shaft 39 passing through the housing of the differential 38 between two crown gears of the same and driving a second differential unit 40, the lateral shafts of which are connected to the driving sprocket wheels 23 of the endless track system 20 of the load-carrying unit 2. The second driving line 39 is provided with universal joints 41, 42, and 43, joints 41 and 42 being located inside the articulation 3 and the joint 43 being disposed inside the chassis 19 of the load-carrying unit 2.

The articulated joint 3 between the two units 1 and 2 comprises the following elements: a pair of parts 44 and 45 are pivoted to each other by two vertically spaced aligned pivots 46. Thus, the parts 44 and 45 can pivot one with respect to the other in a horizontal plane. Each part 44–45 forms a box-like element, of generally rectangular shape, disposed on the side and having a bottom 47 and 48 respectively which is flat and is disposed opposite the transverse flat ends 49 and 50 respectively of the chassis 7 and 19 of the driving unit 1 and of the load-carrying unit 2 respectively.

Parts 44 and 45 have horizontal top and bottom walls, of generally triangular shape, overlapping each other two by two. These horizontal walls are indicated at 51 and 52 for the top walls, and at 53 and 54 for the bottom walls.

Walls 52 and 54 of part 45 are preferably reinforced by vertical webs 55 and 56. Part 44 is provided with lateral ears 57 on each side of the part which overlap ears 58 secured to the end 49 of the driving unit 1.

Ears 57 and 58 are pivoted one to the other by pivots 59. The pivots 59 on each side of part 44 are in horizontal alignment. Therefore, the asembly of parts 44 and 45 can pivot about pitch pivots 59 for movement in pitch with respect to the driving unit 1.

The flat end 49 of chassis 7 of driving unit 1 is spaced from the bottom 47 of part 44 and the said end 49 is provided with compressible studs 60, preferably made of rubber, which protrude towards bottom 47 of part 44. They serve to limit the amplitude of pivoting movement in a vertical plane of the two parts 44 and 45 relative to driving unit 1. Studs 60 are located above and under the pivots 59.

Moreover, a stabilizer unit is disposed between driving unit 1 and part 44. This stabilizer comprises an assembly of superposed longitudinally curved spring blades 61, such as used for the suspension of motor vehicles such as a truck, said assembly 61 being secured at its center to a bracket 63, itself secured to the top of part 44, the free ends of the spring blade 61 being attached to the end 49 of driving unit 1 by pivoted stirrups, not shown, such as used in conventional suspension systems for motor vehicles. Therefore, the spring blade assembly 61 serves to control the pivoting movement in pitch of the assembly of parts 44 and 45 relative to driving unit 1.

Chassis 19 of the load-carrying unit 2 is provided with a tube 64 longitudinally disposed and rigidly maintained in position by a transverse plate 65, which is part of chassis 19, and by the terminal transverse plate 50 of the chassis 19.

Tube 64 protrudes from plate 50 and extends through a hole made in the bottom 48 of part 45 and is provided with a collar 66, which retains bottom 48 against the end transverse plate 50 but which allows relative rotational movement of these two elements in roll that is about the longitudinal vehicle axis, tube 64 serving as a pivot.

A stabilizer is disposed between part 45 and chassis 19 of the load-carrying unit 2. This stabilizer includes also means to limit the angle of pivotal movement of part 45 with respect to chassis 19. This shock absorber comprises a cylinder 68 pivoted at its top end to the center of a transverse member 69, which is part of the front log retaining frame 32.

A piston rod 70 protrudes from the lower end of cylinder 68 and is pivoted to the center of part 45 adjacent bottom 48.

A compression spring 71 is disposed between the piston 72 and the lower end of cylinder 68. When the part 45 and the chassis 19 are in a normal relative angular position, their tops being substantially parallel, the stabilizer 68 has a minimum of elongation, that is spring 71 has a maximum elongation, and during pivoting movement of part 45 with respect to chassis 19, or vice versa, the shock absorber 68 elongates irrespective of the direction of rotation and, therefore, spring 71 compresses and increases the resistance to said rotation; the elongation of the stabilizer has a limit which defines the limit of relative rotational movement of part 45 and chassis 19.

The second transmission shaft 39 extends freely through holes 73 and 74 made in the end 49 of chassis 7 and in the bottom 47 of part 44.

Universal joints 41 and 42 are disposed inside the box-like element formed by the two parts 44 and 45.

Portion 39' of the second transmission shaft 39, which is disposed between the two universal joints 41 and 42, is vertically inclined and is formed of two telescopic parts splined to each other.

Portion 39" of the second transmission shaft 39 is disposed between joints 42 and 43 extends through tube 64, being mounted in journals 75 inside the tube.

Portion 39''' protrudes rearwardly from tube 64 and is finally joined to the second differential 40 by universal joint 43.

Obviously, suitable journals, not shown, may be provided to support the transmission shaft in the zone of end 49 of unit 1 and in the front end of tube 64.

Motorized means serve to pivot parts 44, 45 one with respect to the other in a horizontal plane about pivots 46. These means serve to steer the vehicle. These means comprise a pair of double-acting cylinder and piston units 76 disposed on each side of pivots 46 and longitudinally of parts 44 and 45 and pivoted at their respective ends to the bottom 47 of part 44 and to the bottom 48 of part 45.

Figure 7:
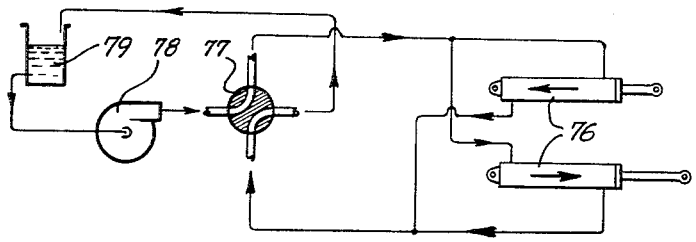
FIGURE 7 and FIGURE 8 are schematic views of the hydraulic steering system in two positons of the control valve.
Figure 8:
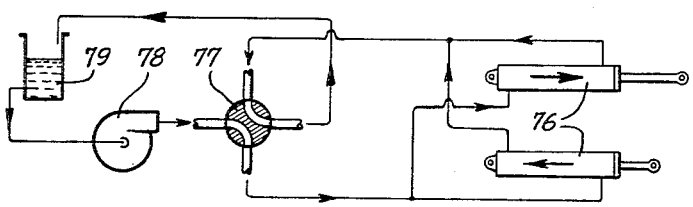
Figure 9:
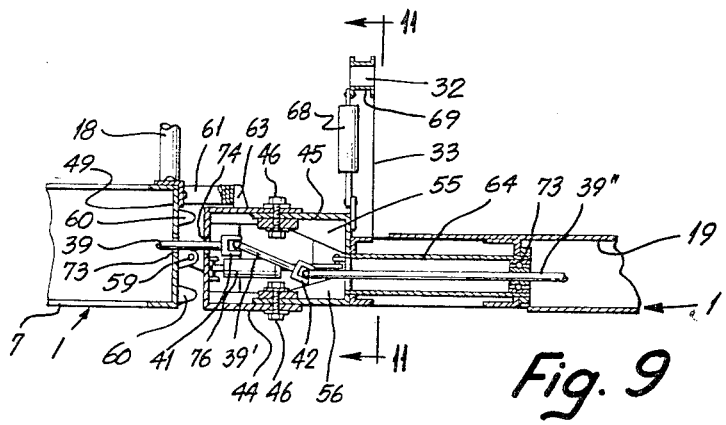
FIGURE 9 is a longitudinal section of the articulation zone or joint.
Figure 10:
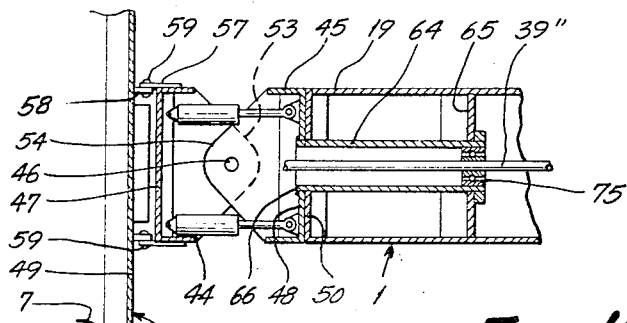
FIGURE 10 is a plan section of the same joint.
Figure 11:
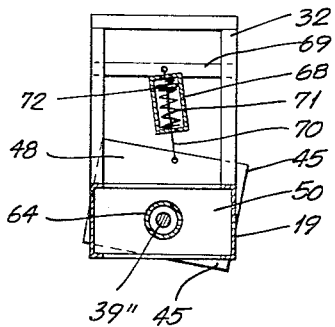
FIGURE 11 is a transverse section taken along line 11—11 of FIGURE 9.

Hydraulic cylinder and piston unit 76 are connected to a hydraulic circuit, as shown in FIGURE 7, and comprising a control valve 77, a hydraulic pump 78 driven by the internal combustion engine 14 and a hydraulic reservoir 79.

The circuit is such that the two cylinders 76 operate in reverse direction under manipulation of the control valve 77 which is accessible to the conductor seated on one or the other of seats 15 and 16. The control valve 77 can also block the cylinders in any desired extended position.

Cylinders 76 cause positive pivoting movement of the two units 1 and 2 with respect to each other in a horizontal plane in order to steer the articulated vehicle, the differential 38 and 40 acting in a conventional manner during a turn, that is there is no necessity for declutching and braking one of the endless tracks of each unit during a turn. Thus, the four endless tracks are always in clutching engagement.

It should be noted that during travelling of the vehicle over rough ground, the pivoting movements in a vertical and in a transverse plane of one unit with respect to the other, are effected at the pivots 59 and at the pivot tube 64 respectively. Therefore, these movements have no influence on the steering action produced by the cylinders 76 which maintain the two units at a predetermined horizontal angle for making a turn.

In the system in accordance with the invention, there is, therefore, no need to provide a compensating mechanism for the position of the cylinders 76 when the two units pivot about pivots 59 and pivot tube 64 to angular positions other than their normal relative positions. Moreover, it should be noted that pivots 59 and 46, which are the pivots subjected to the maximum stresses, are of double spaced construction and, therefore, the joint or articulation in accordance with the invention is highly resistant to stresses. Because the steering pivot 46 is spaced from the pitch pivot 59 towards the load carrying unit 2, the joint parts are not subjected to vertical bending forces when unit 1 pulls loaded unit 2 and the two units pivot in pitch.

The stabilizer systems, together with the means to limit relative pivoting movement, are of very simple construction and very efficient in use.

The vehicle in accordance with the invention can negotiate very rough ground, including slippery ground, with ease.

What I claim is:

1. In an articulated vehicle comprising first and second units, each having a chassis and means for supporting the chassis on the ground, said first unit carrying the vehicle engine and said second unit having means to carry a load, a joint system interconnecting the two units comprising a first part pivoted to one end of the chassis of the first unit about a pitch pivot for relative pivotal movement in pitch only, a second part pivoted to the end of the chassis of the second unit for relative pivotal movement in roll only, steering pivot means interconnecting the two parts for relative pivoting movement of said two parts in a horizontal plane only, said steering pivot means located on an axis which is spaced from the pitch pivot towards said second unit, and motorized extensible means connected at their ends to said first and second parts and disposed on each side of said steering pivot means, to effect the relative pivoting movement of said two parts and, therefore, of said two units in a horizontal plane in order to steer the vehicle while allowing free relative pivoting movement of said units in pitch and in roll.

2. In an articulated vehicle as claimed in claim 1, wherein said first part is pivoted at the end of the chassis of said first unit by means of two spaced aligned pivots disposed on a transverse horizontal axis, said pivot means between the two parts consisting of two pivot members which are spaced and aligned on a central vertical axis, and wherein said second part is pivoted to the end of the second unit by means of a tube longitudinally disposed with respect to said second part and said second unit and secured to one of said second part and said second unit and about which the remaining one of said second part and second unit can rotate.

3. In an articulated vehicle as claimed in claim 1, wherein said two parts consist of box-like elements with overlapping top and bottom walls pivotally interconnected two by two to form said steering pivoting means, said box-like elements having bottom walls disposed adjacent the respective units, and wherein said motorized extensible means consist of a pair of double-acting hydraulic cylinder and piston units confined within, and pivoted at their ends, to said two box-like elements.

4. In an articulated vehicle as claimed in claim 1, comprising a first stabilizer between said first part and said first unit to progressively resist pivoting movement in pitch and stop means to limit the amplitude of pitch movement of said first part with respect to said first unit.

5. In an articulated vehicle as claimed in claim 4, further including means to progressively resist and to limit relative pivotal movement in roll of said first part and of said first unit, comprising an elongated extensible element, elastic means to maintain said element in a normal contracted position, said extensible element being pivoted at one end to said second part at a point of the latter spaced from the pivotal axis between said second part and said second unit, said point being in a vertical plane passing through said last-named axis, the other end of said extensible element being pivoted to said second unit at a point of said vertical plane, said extensible element having a maximum compressed position in the normal relative angular position of said second part and of said second unit and being subjected to elongation during relative pivoting movement of said second unit with respect to said second part in one or the other direction of rotation.

6. In an articulated vehicle comprising first and second units, each having a chassis and means for supporting the chassis on the ground, said first unit carrying the vehicle engine and said second unit having means to carry a load, a joint system interconnecting the two units comprising a first part pivoted to one end of the chassis of the first unit about a pitch pivot for relative pivotal movement in pitch only, a second part pivoted to the end of the chassis of the second unit for relative pivotal movement in roll only, steering pivot means interconnecting the two parts for relative pivoting movement of said two parts in a horizontal plane only, said steering pivot means located on an axis which is spaced from the pitch pivot towards said second unit, and motorized extensible means connected at their ends to said first and second parts and disposed on each side of said steering pivot means, to effect the relative pivoting movement of said two parts and, therefore, of said two units in a horizontal plane in order to steer the vehicle while allowing free relative pivoting movement of said units in pitch and in roll, and further including means to progressively resist and to limit relative pivotal movement in roll of said first part and of said first unit, comprising an elongated extensible element, elastic means to maintain said element in a normal contracted position, said extensible element being pivoted at one end to said second part at a point of the latter spaced from the pivotal axis between said second part and said second unit, said point being in a vertical plane passing through said last-named axis, the other end of said extensible element being pivoted to said second unit at a point of said vertical plane, said extensible element having a maximum compressed position in the normal relative angular position of said second part and of said second unit and being subjected to elongation during relative pivoting movement of said second unit with respect to said second part in one or the other direction of rotation.

References Cited

UNITED STATES PATENTS

| | | | |
|---|---|---|---|
| 2,272,619 | 2/1942 | Flynn | 180—5 |
| 2,883,774 | 4/1959 | Clifford | 180—50 X |
| 2,933,143 | 4/1960 | Robinson | 180—14 |
| 3,035,654 | 5/1962 | Nuttall | 180—14 |
| 3,163,249 | 12/1964 | Ledhowski | 305—23 |
| 3,244,249 | 4/1966 | Thomas | 180—14 |

RICHARD J. JOHNSON, Primary Examiner

U.S. Cl. X.R.

180—14, 51